United States Patent Office 3,549,671
Patented Dec. 22, 1970

3,549,671
4-CHLORO-PREGNADIENE-STEROIDS AND METHOD OF MAKING THE SAME
Henry Laurent, Helmut Hofmeister, Friedmund Neumann, and Rudolf Wiechert, Berlin, Germany, assignors to Schering AG, Berlin and Bergkamen, Germany
No Drawing. Filed Apr. 2, 1968, Ser. No. 718,216
Claims priority, application Germany, Apr. 5, 1967,
Sch 40,494
Int. Cl. C07c *169/32*
U.S. Cl. 260—397.4                             4 Claims

ABSTRACT OF THE DISCLOSURE

4 - chloro - 1,2α - methylene - $\Delta^{4,6}$ - pregnadiene - 17α-ol-3,20-dione and the 17-esters thereof.

An example is 4-chloro-1,2α-methylene-$\Delta^{4,6}$-pregnadiene-17α-ol-3,20-dione-17-acetate.

The compounds have a high progestational and ovulation suppressing action with only very minor antiandrogenic side effects.

BACKGROUND OF THE INVENTION

Various steroids have become known having a more or less marked progestational action. However, most of these compounds require injection to be effective. Furthermore, they usually have undesirable antiandrogenic side effects.

SUMMARY OF THE INVENTION

It is therefore an object of the present invention to provide for compounds having a strong progestational and ovulation suppressing action in case of oral application.

It is a further object to provide for such compounds which, together with their progestational action and the suppression of ovulation, have only a very minor antiandrogenic side effect.

These objects are met by compounds selected from the group consisting of 4-chloro-1,2α-methylene-$\Delta^{4,6}$-pregnadiene-17α-ol-3,20-dione and its 17-esters.

The compounds may be made by any one of the following processes:

(a) A corresponding 6β-hydroxy-7α-chloro-$\Delta^{4}$-3-ketosteroid may be reacted with an acid chloride in the presence of an organic base, or (b) A corresponding 6β,7α-dichloro-$\Delta^{4}$-3-ketosteroid may be reacted with an alkali halide in the presence of a basic solvent, and preferably upon addition of an alkali or alkaline earth carbonate, or (c) A corresponding $\Delta^{4,6}$-3-ketosteroid may be chlorinated in the 4-position, or (d) A corresponding 4-chloro-$\Delta^{1,4,6}$-3-ketosteroid may be methylenated in the 1,2-position.

Following any one of these reactions, a free 17-hydroxy group that may be present in the product may then be esterified, or an esterified 17-hydroxy group present in the product may be subjected to saponification.

DESCRIPTION OF THE PREFERRED EMBODIMENTS

As stated, the compounds of the invention are either the 4-chloro-1,2α-methylene-$\Delta^{4,6}$-pregnadiene-17α-ol-3,20-dione or the 17-esters thereof. Preferred esters are the acylates of carboxylic acids having up to 15 carbon atoms, particularly lower and intermediate aliphatic carboxylic acids. The acids may also be unsaturated, branched polycarboxylic acids or they may be substituted in conventional manner, for instance by amino, hydroxyl or carboxyl groups, or by halogen atoms. If it is desired to obtain water-soluble compositions, it is preferred to use esters of inorganic acids, such as those of sulfuric or phophoric acid.

Regarding the processes above summarized, it should be noted that the splitting off of water in the process listed in the Summary at (a) can be effected in conventional manner upon simultaneous migration of the chlorine atom from the 7α- into the 4-position. The water elimination can be effected, for instance, with an acid chloride, such as methane-sulfonic acid-chloride, in the presence of an organic base. Preferably, elevated temperatures are employed to shorten the reaction time. The reaction is complete usually after 1 to 5 hours at temperatures between 50 and 120° C.

Regarding the process listed in the Summary at (b), it is noted that the hydrogen chloride elimination and rearrangement of the 7-chlorine atom into the 4-position can likewise be effected in conventional manner. According to a preferred embodiment, reaction is effected between the 6,7-dichloro-product in a basic solvent, preferably dimethylformamide, with an alkali-halide such as lithiumchloride or -bromide at elevated temperature. Preferably, the reaction takes place in the presence of an alkali- or alkaline earth-carbonate, such as lithium- or calciumcarbonate. The reaction time depends on the reaction temperature. For instance, at 140° C. the reaction time is about 2 hours. The reaction is preferably carried out upon exclusion of the oxygen of the air, for instance by use of a nitrogen atmosphere.

The chlorination of the $\Delta^{4,6}$-dienone according to the process above summarized at (c) is likewise effected in conventional manner. For instance, the 4-chloro-substitution is carried out under the action of elemental chlorine in the presence of a lower carboxylic acid and using an organic base as solvent, the temperature perferably being between $-30$ and $+30°$ C.

Preferred organic bases are dimethylformamide and pyridine. However, lutidine, collidine, aniline, diethylamine, etc. may also be used.

The methylenation of the $\Delta^{1,4,6}$-3-ketone in the process summarized above at (d) is carried out in conventional manner, for instance by reacting of a 1-mol equivalent of dimethylmethylenesulfoniumoxide with the unsaturated ketone at a temperature between $-40$ and $+100°$ C., and preferably at room temperature. Dimethylmethylenesulfoniumoxide can be liberated in a reaction mixture of trimethylsulfoxonium salts, such as halides, perchlorates or methylsulfates, with bases such as sodiumhydride or sodium- or potassium-hydroxide or -alcoholate. The reaction is effected in an aprotonic solvent or solvent mixture. A purification operation must follow, since the desired 1,2α-methylene-compound will be contaminated with the 1,2α;6,7β-dimethylene-compound even when using stoichiometric amounts. The methylene-compounds are preferably converted to iodomethyl-compounds for the purpose of the chromatographic separation. The reaction with hydrogeniodide in formic acid at room temperature leads to 4-chloro-1α-iodomethyl-$\Delta^{4,6}$-3-ketosteroid and 4-chloro-7β-iodomethyl - 1,2α - methylene-Δ⁴-3-ketosteroid. The 1,2α-methylene-group is reconverted, for instance by heating of the 1α-iodomethyl-compound in collidine, after separation of the 4-chloro-1α-iodomethyl-$\Delta^{4,6}$-3-ketosteroid.

The compounds of the invention are valuable pharmaceutical products. They have a surprisingly strong progestational and ovulation suppressing action in the case of oral applications, with only very minor anti-androgenic side effects. This will be clearly apparent from the following table, where a preferred embodiment, 4-chloro-1,2α-methylene - $\Delta^{4,6}$ - pregnadiene-17α-ol-3,20-dione-acetate (Compound I) is compared with other progestational compounds of high efficiency (Compounds II and III).

For the purpose of the tests, the progestational action was determined as usual by ascertaining the limit value in the peroral Clauberg Test, that is, the minimum amount necessary to obtain an affirmative action.

The ovulation suppression was determined by tube inspection. The table lists as $WD_{50}$ that daily dose which results in omission of the ovulation with 50% of the animals (female rats).

TABLE I

| Compound | Progestational action unit value (mg) | Ovulation suppression $WD_{50}$ (mg) |
| --- | --- | --- |
| I. 4-chloro-1,2α-methylene-$\Delta^{4,6}$-pregnadiene 17α-ol-3,20-dione-17-acetate. | 0.02 | 1 |
| II. 1,2α-methylene-$\Delta^{4,6}$-pregnadiene-17α-ol-3,20-dione-17-acetate. | 0.1 | >10 |
| III. 17α-ethinyl-19-nor-$\Delta^4$-androstene-17β-ol-3-one. | 0.1 | 3 |

The main application of the compounds of the invention is in the treatment of the following gynecological disorders: primary and secondary amenorrhea of longer duration, cycle irregularities in the case of insufficient yellow body function, endometriosis, hypoplasia of the uterus, premenstrual complaints and mastopathy. A treatment with the new compounds is also indicated if it is desired to avoid conception.

The dosage depends on the seriousness of the specific case. In general, a daily dose of between 1 and 50 mg. of active compound may be used.

The making of the pharmaceutical products may be effected in the conventional manner by incorporating the active materials with suitable carrier substances. Carrier substances may be organic or inorganic materials which are suitable for either enteral or parenteral application and which do not enter into reaction with the new compounds, such as, for instance, water, alcohols, vegetable oils, polyethyleneglycols, lactose, starch, talcum, gelatin, magnesium stearate, sodium laurylsulfate, etc.

The new compounds can be used in the form both of orally or parenterally administered pharmaceuticals. The content of active substance should be, for instance in the case of capsules or tablets, about 1 to 15 mg. per unit, in case of aqueous solutions for oral applications about 0.5 to 2 mg. per 1 ml., and in case of oily solutions for intramuscular injection about 1 to 20 mg. per 1 ml.

The following are preferred examples of specific compoundings:

(1) Gelatin capsules having each 5 mg. of active substance

Composition for one capsule: Mg.
4 - chloro - 1,2α - methylene-$\Delta^{4,6}$-pregnadiene-17α-ol-3,20-dione-17-acetate (finely reduced to a particle size 2–8μ, with a few particles 16μ) _____ 5
Lactose _____ 200
                                          205

The substance is placed in the conventional manner into hard gelatin two-piece capsules.

(2) Tablets containing 15 mg. active substance

Composition for one tablet: Mg.
4-chloro - 1,2α - methylene-$\Delta^{4,6}$-pregnadiene-17α-ol-3,20-dione - 17 - acetate (finely reduced to a particle size 2–8μ, with a few particles 16μ) _____ 15.000
Lactose, DAB 6 (Deutsches Arzneibuch, 6th ed.), U.S.P. XVI _____ 24.000
Cornstarch, U.S.P. XVI _____ 45.065
Talcum, DAB 6, U.S.P. XVI _____ 4.000
Gelatin, white, DAB 6 _____ 1.400
Sodium laurylsulfate, U.S.P. XVI _____ 0.500
p-Oxybenzoic acid methylester, DAB 6, 3rd supplement, U.S.P. XVI _____ 0.024
p-Oxybenzoic acid propylester, DAB 6, 3rd supplement, U.S.P. XVI _____ 0.011
                                          90.000

(3) Preparations that can be administered as drops, 1 ml.=2 mg. of active substance (1 ml. corresponds to 30–35 drops)

Composition for 100 ml.:
4 - chloro - 1,2α - methylene-$\Delta^{4,6}$-pregnadiene-17α-ol-3,20-dione-17-acetate _____mg__ 200
Ethyl alcohol _____ml__ 20
Propyleneglycol _____ml__ 25
Plus water to make up 100 ml.

(4) Oily solutions for intramuscular injection 1 ml.=2 mg. active substance

Mg.
4 - chloro-1,2α-methylene-$\Delta^{4,6}$-pregnadiene-17α-ol-3,20-dione-17-acetate _____ 2.0
Benzyl alcohol _____ 20.0
Sesame oil _____ 905.9
                                    [1] 927.9

[1] =Ml.

The following examples will illustrate the invention without any intention of limitation:

(A) Processes for making the starting products

7α-chloro-1,2α-methylene-$\Delta^4$-pregnene-6β,17α-diol-3,20-dione-17-acetate.—A solution of 5.0 g. 1,2α-methylene-$\Delta^{4,6}$-pregnadiene-17α-ol-3,20-dione-acetate in 250 ml. dioxane was reacted with 20.0 g. N-chlorosuccinimide, 135 ml. water and 12.5 ml. 70% perchloric acid. The reaction was complete after 90 minutes at room temperature. The mixture was poured into sodium sulfite-containing water, was subjected to suction, and the precipitate was taken up in methylenechloride, washed with water and dried over sodium sulfate. The solvent was evaporated in vacuum and the residue was recrystallized from methylenechloride/diisopropylether. There was obtained 2.24 g. 7α-chloro-1,2α-methylene-$\Delta^4$-pregnene - 6β,17α - diol-3,20-dione-17-acetate, M.P. 239–239.5° C. UV: $\epsilon_{230}$=12,900.

6β,7α-dichloro-1,2α-methylene-$\Delta^4$-pregnene-17α-ol-3,20-dione-acetate.—5.0 g. 1,2α-methylene-$\Delta^{4,6}$-pregnadiene-17α-ol-3,20-dione-acetate was dissolved in 65 ml. absolute trichloroethylene and reacted with a solution of 9.28 g. chlorine in 135 ml. absolute carbon tetrachloride. After a reaction time of 2 hours at −20° C., the reaction mixture was diluted with chloroform and successively washed with dilute sulfuric acid, sodium hydrosulfite solution, sodium bicarbonate and water. The residue was subjected to chromatography over silica gel after drying and concentration by evaporation. After recrystallization from ethyl acetate, 1.30 g. 6β,7α-dichloro-1,2α-methylene-$\Delta^4$-pregnene-17α-ol-3,20-dione-acetate was obtained, with a melting-point between 254 and 256° C. UV: $\epsilon_{234}$=12,600.

(B) Example I

A solution of 200 mg. 7α-chloro-1,2α-methylene-Δ⁴-pregnene-6β,17α-diol-3,20-dione-17-acetate in 2.8 ml. dimethylformamide was reacted with 0.8 ml. pyridine and 0.4 ml. methanesulfonic acid chloride and heated for 3 hours to 85° C. The mixture was subjected to precipitation with water, followed by suction, washing with water and drying in vacuum. The crude product was purified by means of thin layer chromatography. After recrystallization from acetone/hexane, 50 mg. 4-chloro-1,2α-methylene-Δ⁴,⁶-pregnadiene-17α-ol-3,20 - dione-acetate was obtained with a melting-point between 256 and 256.5° C. UV: $\epsilon_{295}=18,500$.

Example II 2.26 g. 6β-7α-dichloro-1,2α-methylene-Δ⁴-pregnene-17α-ol-3,20-dione-acetate, 1.11 g. lithiumcabonate, 1.3 g. lithiumbomide and 50 ml. dimethylfomamide were stirred for 2 hours under a current of nitrogen at 140° C. The product was subsequently taken up in ether, washed with dilute sulfuric acid and water, dried, and evaporated in vacuum to dryness. The residue was subjected to chromatography over silica gel. After recrystallization from ethyl acetate, there was obtained 450 mg. 4-chloro-1,2α-methylene-Δ⁴,⁶-pregnadiene-17α-ol-3,20-dione-acetate, with a melting-point between 248 and 250° C. UV: $\epsilon_{295}=17,500$.

Example III 5.0 g. 1,2α-methylene - Δ⁴,⁶ - pregnadiene-17α-ol-3,20-dione-acetate was dissolved in 200 ml. dimethylformamide and reacted with a solution of 930 mg. chlorine in 14.25 ml. propionic acid. The mixture, after a reaction time of 18 hours at −15° C., was stirred into ice water, whereupon the precipitate was removed by suction and taken up with methylene-chloride. The organic phase was washed with a sodium bicarbonate solution and water, dried, and evaporated to dryness in vacuum. The residue was subjected to chromatography over silica gel. After recrystallization from ethyl acetate, there was obtained 600 mg. 4-chloro-1,2α-methylene-Δ⁴,⁶-pregnadiene-17α-ol-3,20-dione-acetate, with a melting-point between 250 and 251° C. UV: $\epsilon_{295}=17,900$.

Example IV 240 mg. sodium hydride (in the form of a 50% oil suspension) and 1.1 g. trimethylsulfoxonium-iodide were dissolved in 17 ml. dimethylsulfoxide upon introduction of nitrogen and stirring. There was then added 20 ml. abs. tetrahydrofuran and the solution was chilled to 0° C. 1.5 g. 4-chloro-Δ¹,⁴,⁶-pregnatriene-17α-ol-3,20-dione was then added. The product was then subjected to precipitation in acetic acid ice water after 3 hours stirring at room temperature. The precipitate was removed by suction, taken up in methylenechloride, washed with a sodium bicarbonate solution and water and dried.

The separation of 4-chloro-1α,2α;6β,7β-dimethylene-Δ⁴-pregnene-17α-ol-3,20-dione which occurred as a by-product in an amount of between 5 and 10% was effected by reacting the reaction product with hydriodic acid in formic acid at room temperature. The components 4-chloro-7β-iodomethyl-1α,2α-methylene - 4 - pregnene-17α-ol-3,20-dione and 4-chloro-1α-iodomethyl-Δ⁴,⁶-pregnadiene-17α-ol-3,20-dione were separated by chromatography over silica gel with 20% acetone/hexane. The second of these components was stirred into 5 ml. collidine for 20 hours at 140° C. upon introduction of nitrogen in order to form the 1α,2α-cyclopropane ring. The reaction product was then stirred into hydrochloric acid ice water and extracted with ether. The ether phase was washed with sodium bicarbonate and water. After recrystallization from acetone/hexane, there was obtained 425 mg. 4-chloro-1α,2α-methylene - Δ⁴,⁶ - pregnadiene-17α-ol-3,20-dione, with a melting-point between 246 and 251° C. (acetone/hexane). UV: $\epsilon_{296}=17,500$.

Example V 1.5 g. 4-chloro-1α,2α-methylene-Δ⁴,⁶-pregnadiene-17α-ol-3,20-dione was stirred into 16 ml. glacial acetic acid with 10 ml. glacial acetic acid anhydride and 800 mg. p-toluenesulfonic acid. The stirring was carried out for 17 hours at room temperature upon introduction of nitrogen. The reaction solution was poured into ice water. The precipitate was removed by suction, washed with water and dried. After chromatography over silica gel with 15–20% acetone/hexane, there was obtained 750 mg. 4-chloro-1α,2α-methylene-Δ⁴,⁶-pregnadiene - 17α - ol - 3,20-dione-17-acetate, M.P. 258–259° C. (acetone/hexane). UV: $\epsilon_{296}=18,000$.

Example VI 150 mg. 4-chloro-1α,2α-methylene-Δ⁴,⁶-pregnadiene-17α-ol-3,20-dione-17-acetate was allowed to stand for 3 days at room temperature in 3.5 ml. caproic acid anhydride with 50 mg. p-toluene-sulfonic acid. The reaction mixture was reacted with a little pyridine and subsequently distilled in a current of steam. The aqueous phase was then extracted with ether. The ether phase was dried over sodium sulfate and concentrated to dryness in vacuum. The purification was effected by thin layer chromatography. There was obtained 70 mg. 4-chloro-1α,2α-methylene-Δ⁴,⁶-pregnadiene-17α-ol-3,20-dione-17-capronate in the form of an oil. UV: $\epsilon_{295}=17,400$.

Example VII 200 mg. 4-chlor-1α,2α-methylene-Δ⁴,⁶-pregnadiene-17α-ol-3,20-dione-17-acetate was stirred for 15 hours at room temperature into 30 ml. methanol containing 3.0 ml. 1 N-sodium hydroxide. The reaction solution was neutralized with acetic acid and substantially concentrated in vacuum. The precipitate obtained by pouring into ice water was removed by suction, washed neutral and dried. After recrystallization from acetone/hexane there was obtained 115 mg. 4-chloro-1α,2α-methylene-Δ⁴,⁶-pregnadiene-17α-ol-3,20-dione having a melting point of 245–250° C. UV: $\epsilon_{296}=17,600$.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A compound selected from the group consisting of 4-chloro-1,2α-methylene - Δ⁴,⁶ - pregnadiene-17α-ol-3,20-dione and a 17-carboxylic acid ester thereof having from 1 to 15 carbon atoms in the acyl residue.

2. The compound of claim 1 which is 4-chloro-1,2α-methylene-Δ⁴,⁶-pregnadiene-17α-ol-3,20-dione.

3. The compound of claim 1 which is 4-chloro-1,2α-methylene-Δ⁴,⁶-pregnadiene-17α-ol-3,20-dione-17-acetate.

4. The compound of claim 1 which is 4-chloro-1,2α-methylene-Δ⁴,⁶-pregnadiene - 17α-ol-3,20-dione-17-capronate.

No references cited.

HENRY A. FRENCH, Primary Examiner

U.S. Cl. X.R.

424—243